(12) United States Patent
Ozanne et al.

(10) Patent No.: US 9,538,876 B2
(45) Date of Patent: *Jan. 10, 2017

(54) IDENTIFICATION OF BEVERAGE INGREDIENT CONTAINING CAPSULES

(71) Applicant: NESTEC S.A., Vevey (CH)

(72) Inventors: Matthieu Ozanne, Chessel (CH); Philippe Monceyron, Marignier (FR)

(73) Assignee: Nestec S.A., Vevey (CH)

( * ) Notice: Subject to any disclaimer, the term of this patent is extended or adjusted under 35 U.S.C. 154(b) by 274 days.

This patent is subject to a terminal disclaimer.

(21) Appl. No.: 13/796,280

(22) Filed: Mar. 12, 2013

(65) Prior Publication Data

US 2013/0209620 A1   Aug. 15, 2013

Related U.S. Application Data

(63) Continuation of application No. 12/524,481, filed as application No. PCT/EP2008/050634 on Jan. 21, 2008, now Pat. No. 8,459,179.

(30) Foreign Application Priority Data

Jan. 24, 2007   (EP) .................................... 07101087

(51) Int. Cl.
| | |
|---|---|
| *B65D 53/00* | (2006.01) |
| *A47J 31/44* | (2006.01) |
| *A47J 31/40* | (2006.01) |
| *B65D 85/72* | (2006.01) |
| *B65D 85/804* | (2006.01) |
| *A47J 31/36* | (2006.01) |

(52) U.S. Cl.
CPC ........... *A47J 31/407* (2013.01); *A47J 31/4492* (2013.01); *B65D 85/72* (2013.01); *B65D 85/8043* (2013.01); *A47J 31/3676* (2013.01); *B65D 2203/00* (2013.01)

(58) Field of Classification Search
CPC ...... B65D 81/32; B65D 85/72; B65D 85/8043
USPC ... 99/295, 323, 323.1; 426/77, 232, 84, 115; 206/534

See application file for complete search history.

(56) References Cited

U.S. PATENT DOCUMENTS

| | | | |
|---|---|---|---|
| 3,500,742 A | 3/1970 | Pierre et al. | |
| 4,537,308 A * | 8/1985 | Hollander, Jr. | ............... 206/484 |
| 5,072,660 A | 12/1991 | Helbling | |
| 2002/0048621 A1 | 4/2002 | Boyd et al. | |
| 2003/0116625 A1* | 6/2003 | Litwiller et al. | ............... 235/444 |

(Continued)

FOREIGN PATENT DOCUMENTS

| | | |
|---|---|---|
| EP | 063846 | 2/1995 |
| EP | 1629752 | 3/2006 |

(Continued)

OTHER PUBLICATIONS

International Search Report and Written Opinion issued Jul. 9, 2008 for Intl. Appln. No. PCT/EP2008/050634.

(Continued)

*Primary Examiner* — Reginald L Alexander
(74) *Attorney, Agent, or Firm* — K&L Gates LLP

(57) ABSTRACT

A beverage ingredient capsule (1) provided with an identification member (6) designed for being physically contacted from outside in order to control operation parameters of an associated beverage production machine.

9 Claims, 4 Drawing Sheets

(56) References Cited

U.S. PATENT DOCUMENTS

| | | |
|---|---|---|
| 2008/0302251 A1 | 12/2008 | Rijskamp et al. |
| 2009/0205504 A1 | 8/2009 | Alcantara |
| 2010/0077928 A1 | 4/2010 | Schmed et al. |

FOREIGN PATENT DOCUMENTS

| | | |
|---|---|---|
| WO | 02/28241 | 4/2002 |
| WO | 2005/122851 | 12/2005 |

OTHER PUBLICATIONS

Taylor, "Internationai Business Machines Corporation's Application", In the Appeal Tribunal Before Mr. Justice Graham, Jan. 23, 1970, No. 18, pp. 533-543.

Reports on Patent, Design and Trade Mark Cases, May 29, 1935, *No. Fume Ld.* v. *Frank Pitchford & Co.*, Jan. 25, 29, 30 and 31, 1935, vol. LII, No. 7, pp. 231-253.

\* cited by examiner

IDENTIFICATION OF BEVERAGE INGREDIENT CONTAINING CAPSULES

CROSS REFERENCE TO RELATED APPLICATIONS

This application is a continuation of U.S. application Ser. No. 12/524,481, filed Dec. 22, 2009, which is a U.S. national stage filing of International Appl. No. PCT/EP2008/50634, filed Jan. 21, 2008, which claims priority to EP 07101087.0, filed on Jan. 24, 2007, the entire contents of which are expressly incorporated herein by reference thereto.

BACKGROUND

The invention generally relates to the field of producing a liquid comestible or beverage from ingredients contained in a capsule.

In the recent past beverage ingredient containing capsules have found widespread application for producing different types of beverages, such as for example tea or coffee, and other liquid comestibles. These capsules are designed for a use in connection with a dedicated beverage production machine which is provided with means for feeding a liquid into the interior of the capsule such that the liquid interacts with the ingredients contained in the capsule, the result of the interaction being a produced beverage or other liquid comestibles.

Some of the known machines are provided with sophisticated control systems setting all kind of operation parameters for the beverage production process. These parameters can include (non-exhaustive list) e.g., the temperature and the volume of the liquid supplied to the interior of the capsule as well as the time duration of the interaction of the liquid with the ingredients contained to the capsule.

It is also known that the beverage production machine is provided with a user interface such that the user can set operational parameters according to his/her preferences.

Once these parameters have been manually set, the beverage production machine will use the defined set of parameters for every following beverage production process.

In the state of the art, capsules can be found with identification elements in the form of several mechanical contacts which are selectively sensed by sensing means of the machine. Typically, the contacts are made visible and in relief at the surface of the capsule and are directly sensed by fixed sensing means of the machine. Such system has several disadvantages. External mechanical contacts are exposed and they can be damaged or altered either accidentally or on purpose. The modification of the contacts can create a severe disorder of the system and/or set incorrect beverage parameters.

For instance, EP 0 638 486 relates to a cartridge for the preparation of a beverage comprising a plurality of teeth moulded along one side edge of the cartridge. The teeth have recesses formed there between. The teeth are intended to enable the cartridge to be driven through a beverage preparation machine by the engagement of a cam. At the opposite side of the edge of the cartridge, are formed a plurality of pegs such that as the package is driven into the machine by the engagement of teeth with the cam, the presence or absence of the upstanding pegs is sensed by a sensing arm which thereby will identify a different type of cartridge. The sensing arm operates a switch which thereby transmits information concerning the presence or absence of the pegs on the package to the control mechanism for the beverage dispensing machine. The arrangement of pegs on the cartridge thus identifies the type of cartridge to a controller which then selects the appropriate beverage preparation conditions.

In the state of the art also capsules can be found which are provided at their outer face with a bar code such that the beverage production machine can read the information represented by the bar code and can thus identify the associated capsule. The provision of a bar code has several disadvantages: to start with, as the bar code has to be visible at the outer face of the capsule, this automatically has a negative impact on the aesthetic appearance of the capsule. On the other hand, there is always the risk that in the environment of the beverage production process the legibility of the bar code will be endangered e.g., by water/vapour deposited on the bar code or optical elements of the reader.

For instance, U.S. 2002/0048621 relates to an encoded coffee packet and a beverage producing device comprising a sensor configured to detect encoded data stored on the beverage packet and a processor configured to interpret the encoded data and to direct production of a beverage according to the encoded data. The encoded data can be a visual code such as a barcode, a geometrical shape, a text string, glyph, a digital watermark, notches, grooves or holes.

EP 1 629 752 A2 discloses a beverage production system with a memory that stores information about the order of the beverage cartridges dispensed by the beverage preparation machine.

SUMMARY

Therefore it is the object of the present invention to propose an inexpensive and reliable solution for the identification of beverage ingredient containing capsules.

In particular, one object of the invention is to reduce the risk of misuse or damages of the identification system. Another object is to provide a solution which works well in humid and hot conditions. Another object is to have a solution that can be implemented on a capsule by simple manufacturing operations.

Another object of the invention is to provide a more compact solution able to carry out detection operations in a volume limited environment of the machine.

It is an aspect of the present invention that the visible identification of the prior art is replaced by a "hidden" or less exposed identification.

It is also an aspect of the invention that the cumbersome detection of the prior art is replaced by a compact detection system on both the capsule and machine side.

According to an aspect of the invention, the identification member of the capsule is covered by a deformable, displaceable and/or puncturable cover in order to protect it and reduces the risk of misuse or deterioration of the identification system.

To this regard according to the present invention a capsule is proposed which contains a beverage ingredient. A capsule is provided with an identification member designed for being physically contacted from outside.

The identification member is designed for representing information upon mechanical contact from outside.

Thus the identification members code the information in a structural manner (in contrast to the visual bar code representation of the prior art). More precisely, the identification member can comprise a plurality of predetermined localized contact surface receivers, each of them constituting a choice amongst two different surface levels that correspond upon a contact being established or not, with an external probe member, a binary code state (0 or 1).

A surface level can correspond, for example, to a different in depth or height of a plurality of localized recesses/holes or protruding members.

In an embodiment, first and second contact receivers are provided. First contact receivers can be holes or recesses of a same depth whereas second contact receivers are holes or recesses of shorter depth or, alternatively, are filled or slightly in relief. In a possible variant, first contact receivers are protruding elements of same height whereas second contact receivers are protruding elements of greater height.

Preferably the identification member is not visible from outside and is not exposed to the exterior before being physically contacted by associated probe means of a beverage production machine.

To this regard the identification member can be covered to the outside by cover means, wherein the cover means and/or the identification member are designed to be transferable from a cover state to an identification reading state, e.g., by being penetrated, deformed, displaced etc. by probe means from an associated beverage production machine.

Preferably the identification member is coded by modulating a surface structure of a face of the capsule, e.g., by providing holes or recesses in an identification face of the capsule.

The identification face of the capsule can be covered by a displaceable, deformable or puncturable membrane such as a plastic layer, an aluminium layer or a laminate of plastic-aluminium. The cover thus is designed to be selectively perforated from outside or deformed at portions overlapping the recessions or holes. On the other hand, the cover can resist at least a certain penetration or deformation by being supported at regions which are not overlapping recessions or holes.

Alternatively also the cover member can remain unchanged, but the identification member will be manipulated (e.g., displaced) in order to transfer the capsule from the identification-cover state to the identification-reading state.

In a preferred embodiment, the identification member can be formed in the front of a lid of the capsule which is associated to a cup-shaped body of the capsule to demarcate a cavity containing beverage forming ingredients.

The identification member can be formed as an integral part of the lid. For instance, the lid can be made of a moulded plastic onto which the identification means are moulded.

For limiting the space required for the detection system, the plurality of predetermined localized contact receivers is arranged on the front of the lid in a non-linear pattern. For instance, the receivers can be grouped in a substantially polygonal, star-shaped or curved pattern or a non-regular substantially closed pattern covering the surface of the lid.

The invention also relates to a beverage production system comprising a beverage production machine designed for producing a beverage from ingredients containing the capsule, as well as a capsule as defined above.

A further aspect of the present invention relates to a beverage production machine designed for use with a beverage ingredient containing capsule. The beverage production machine is equipped with means for physically contacting a capsule in order to read information thereof. Further on, the beverage production machine is provided with control means which are functionally connected with the means and are designed to control operation parameters of the beverage production machine in response to the read information. The contact means preferably comprise at least one displaceable probe which mechanically contacts the capsule, wherein the control means are initially arranged with the at least one probe to detect an identification information in relation to the degree of displacement of the probe in response of its contact with the capsule.

More particularly, the at least one displaceable probe is resiliably positioned at a distance of a circuitry of the control means and is selectively moved into contact with said circuitry depending on its contact with the capsule wherein the contact of the probe and circuitry constitutes a predetermined binary coded state (0 or 1) and the non-contact of the probe and circuitry constitutes the other binary coded state.

In order to significantly reduce the size of the identification system, the identification member can be associated to a printed circuitry. The printed circuitry can be of a width of a few millimeters only and inserted in a small space of the machine adjacent the housing of the capsule. For instance, thickness of the printed circuitry is of 0.5 to 3 mm.

The printed circuitry comprises for instance, a plurality of printed circuits which are selectively closed or opened by a plurality of the probes to provide the coded state.

The at least one probe is preferably coupled or is at least part of a resilient support member and is associated to the circuitry for both providing the elasticity to the probe to enable its return into a non-contact position and the insulation of the circuitry from the humidity coming from the capsule.

The resilient support member can be, for instance, an elastomeric, preferably silicone member.

The probes can further be formed of pins which have a base embedded or inserted in a seat of the support member.

The control means can be designed to control, in response to the read information, a beverage production temperature such as for example the temperature of a liquid supplied to the interior of the capsule.

The beverage production machine can be designed to produce tea, coffee and/or other beverages.

The contacting means can comprise a plurality of movable pins forming a predetermined pattern which mechanically selectively contact the predetermined localized surface receivers of the capsule.

The control means can be designed to detect the identification information via the degree of displacement of the pin against the capsule.

The displacement of the pin can be made such that it selectively opens an associated contact of a circuitry of the control means.

The at least one pin is preferably electrically isolated from control means circuitry.

A further aspect of the present invention relates to a method for controlling the operation of a beverage production machine designed for producing a beverage from a beverage-ingredient containing capsule.

The method comprises the step of physically contacting the capsule by probe means of a beverage production machine in order to read identification information from a dedicated identification member of the capsule. In a further step, operation parameters of the beverage production machine are set in response to the read identification information.

Additional features and advantages are described herein, and will be apparent from the following Detailed Description and the figures.

Further advantages, features and objects of the present invention shall now be explained with reference to the figures of the enclosed drawing.

DETAILED DESCRIPTION

Figure 1:
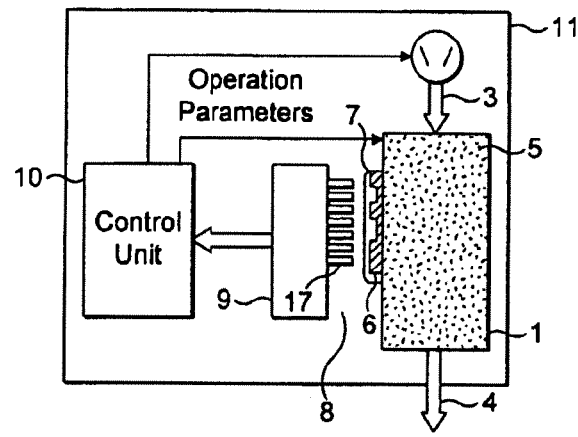
FIG. 1 shows a schematic overview of a system according to the present invention designed for reading identification information from a beverage ingredient containing capsule.

Generally it is an aspect of the present invention that a beverage production machine 11 is designed to produce a beverage from a capsule 1 positioned at a dedicated beverage production position of the beverage production machine 11. As shown in FIG. 1 the capsule has a dedicated compartment for containing beverage ingredients 5.

A liquid 3, controlled by a control unit 10 of the beverage production machine 11, is made to enter the capsule 1 in order to interact with the ingredients 5 contained therein. The result of the interaction, i.e., a produced beverage or liquid comestible, can then be obtained (reference 4) from the beverage production machine 11.

Typical examples for the nature of the interaction between the liquid 3 and the ingredients 5 are brewing, mixing, extracting, dissolving etc. Different types of ingredients can be present in the beverage compartment and different types of interactions can take place in the capsule.

The system as shown in FIG. 1 is provided with means for retrieving ("reading") identification data from the capsule 1 in order to transfer the read identification data to the control unit 10, such that the control unit 10 can control the operation of a following production cycle of the beverage production machine 11 depending on the content of the read identification data.

The identification data can refer to parameters of the capsule and/or the ingredients.

According to one aspect of the invention the identification information can be read from the capsule 1 in a non-optical manner, as the optical reading e.g., using a bar code has the disadvantages of having a negative impact on the aesthetic impression of the outer appearance of the capsule and of being prone to failure due to the legibility of the bar code in the environment of the beverage production process.

The capsule 1 according to the present invention is provided with an identification member 6 which carries, in a coded manner, identification information. Preferably the information is coded in a digital manner. In a preferred embodiment, the identification member 6 can be formed in the front of a lid 2 of the capsule 1 which is associated to a cup-shaped body of the capsule 1 to demarcate a cavity containing the beverage ingredients 5.

Preferably the information is coded by a modulation of the surface structure of a face of the capsule 1. E.g., a hole or a recession can represent one logical state (e.g., "0"), while another surface state ("no recession" or "no hole") can represent the other logical state (e.g., "1").

Replacing the bar code by a surface modulation which can then be detected in a non-optical manner (or even in an optical manner) enhances the reliability of the information reading from the capsule.

Preferably the identification member 6 is arranged at the capsule 1 such that it is not exposed to and usually not visible from outside. To this regard a cover 7 can be provided for the identification member 6. The cover 7 serves for aesthetic and/or protective purposes with regard to the identification member 6.

(As a side remark, such cover 7 is also useful in combination with a bar code and a visual reading of information.)

The cover 7 and the identification member 6 are part of the capsule and arranged such that at the beginning the identification member is in a protected state. Probe means of the beverage production machine can then manipulate the system cover means/identification member such that the system cover means/identification member is transferred from a covered state to an identification reading state in which the probe means can read visually or through mechanical contact the information encoded in the identification member. The manipulation can take place with regard to the identification member and/or the cover means.

Preferably the cover 7 is only carrying out the complete covering function as long as no detection process has been carried out. Along with the detection process, as will be explained later on, the cover 7 can be e.g., at least partially removed, displaced, deformed or perforated.

Alternatively the cover 7, during the information reading process, is deflected in order to follow the surface contours of the identification member arranged below the cover. To this regard a flexible cover 7 can be foreseen which can be deflected from outside in order to read the surface structure of the identification member 6 arranged below the cover 7.

The beverage production machine 11 is provided with probe means 8 which are designed to read the information coded by modulating the surface structure of the identification member 6.

Preferably such detection is carried out by means of a physical mechanical contact or an electric contact, although as surface modulation can also be read optically.

To this regard the probe means 8 can preferably present a plurality of displaceable pins 17, which during the information reading process are biased against the identification member 6 of the capsule 1.

Depending on the specific shape of the surface structure of the identification member 6 at the contact area between a pin 17 in the identification member 6, a pin 17 will thus be allowed to protrude more or less towards the capsule 1.

In case the information is coded in digital manner by the surface structure of the identification member 6, correspondingly also there will be a digital encoding of the displacement positions of the pins 17, i.e., there will only be a more protruding and a less protruding position for the pins 17.

This relative displacement of the pins 17 is converted into electrical signals by a detection unit 9. The thus generated electrical detection signals can then be processed by the control unit 10.

The detection unit 9 thus is designed to convert a mechanically read information into electronic signals.

The control unit 10 will then set, as a function of the read identification data from the capsule, parameters of the beverage production process, such as for example (non-exhaustive list) the flow rate and temperature of the supplied liquid 3 as well as the interaction time etc.

Figure 2:
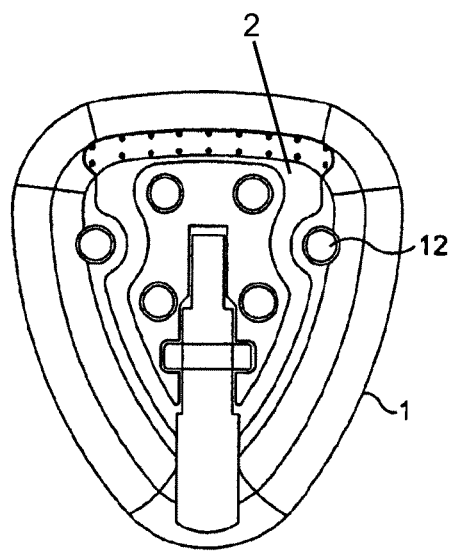
FIG. 2 shows a front view of a capsule according to the present invention.

FIG. 2 shows a top view of the capsule 1. According to the embodiment shown in FIG. 2 the surface structure of the identification member is modulated by providing selectively a plurality of holes 12. Having a hole 12 at a predefined position represents one logical state, while not having the hole at the same position would represent respectively another digitally coded state.

Figure 3:
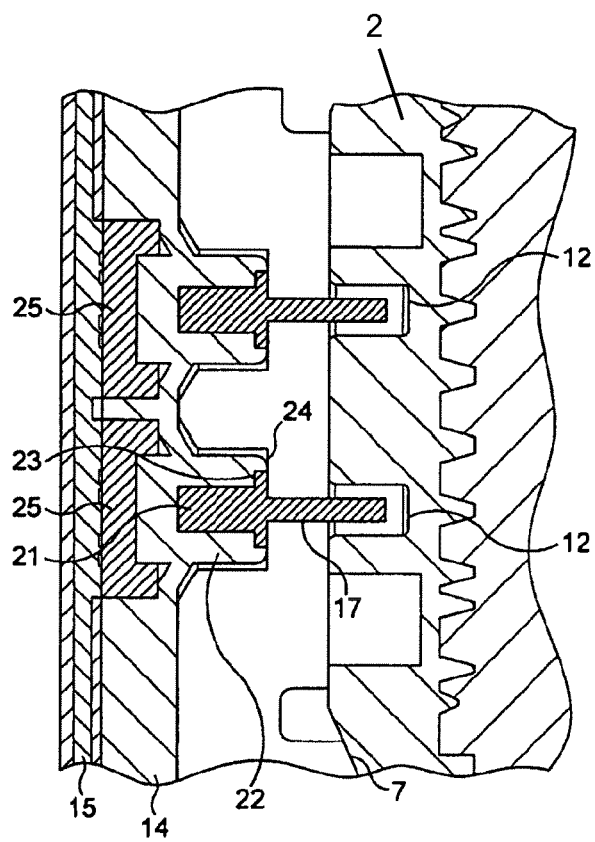
FIG. 3 shows a detailed view of the interaction part between probe means of the beverage production machine and identification member of the capsule.

FIG. 3 illustrates the conversion of the mechanical reading of the digitally coded information of the identification member of the capsule 1 into electric signals.

As can be seen in FIG. 3, a pin 17 is isolated from an electronic circuitry board 15 by means of a resilient and electrically isolating material layer 14, such as e.g., silicone. The layer 14 will thus provide the necessary biasing force in order to slightly press the pin 17 towards the capsule and eventually perforate or deform any cover provided on top of the identification member of the capsule.

The rear end of each pin 17 has an enlarged section 21 which is embedded in a protruding section 22 of the layer 14. Each pin 17 can be provided with a flange 23 which flushed with the top surface 24 of the protruding section 21 of the layer 14.

In the state shown in FIG. 3 the two depicted pins 17 are respectively protruding into holes 12 of the identification member and have perforated the cover 7. Thus these two pins 17 are not pushed rearwards are thus not activating electrical micro-switches 25 designed to selectively produce electrical short circuits of dedicated portions of a printed circuit board 15. Further details of the PCB 15 will be explained with reference to FIG. 5.

Each pin 17 can be inserted in a recess of the elastic layer 14 such as by press-fitting or overmoulding. The pins are preferably more rigid than the support layer 14. The pins can be made of metal or hard plastic. The pins and layer 14 can also be made by co-injection of a rubber elastic material of different hardness.

In case due to the surface structure of the identification member the pin 17 is not allowed to further protrude into the surface structure of the identification member 3, it will thus be slightly pushed rewards (to the left inside FIG. 3) thus pushing silicone material to activate (i.e., transfer in the conducting state) a electrically conducting micro switch 25 towards the printed circuit board 15. To this regard the face of the silicone material facing the printed circuit board 15 can be coated with an electrically conducting layer which can selectively produce a defined short circuit on the printed circuit board 15, the defined short circuit corresponding to closing a switch.

Figure 5:
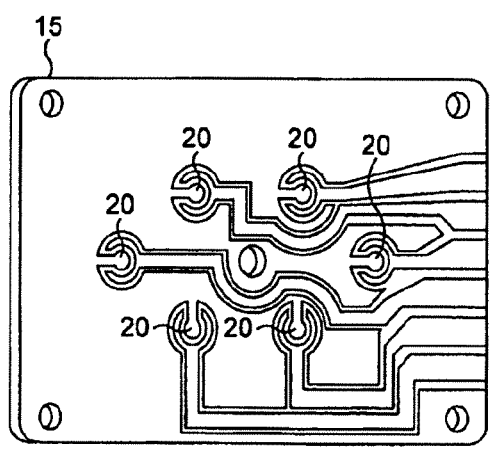
FIG. 5 shows a printed circuit board which can be associated with the probe means.
Figure 6:
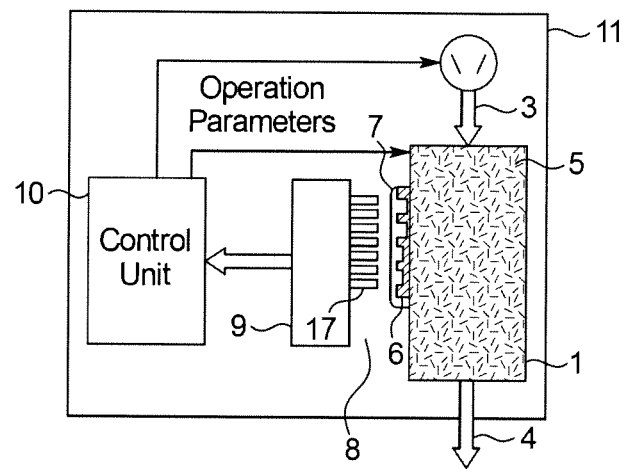
FIG. 6 shows a schematic overview of a system according to the present invention designed for reading identification information from a beverage ingredient containing capsule.
Figure 7:
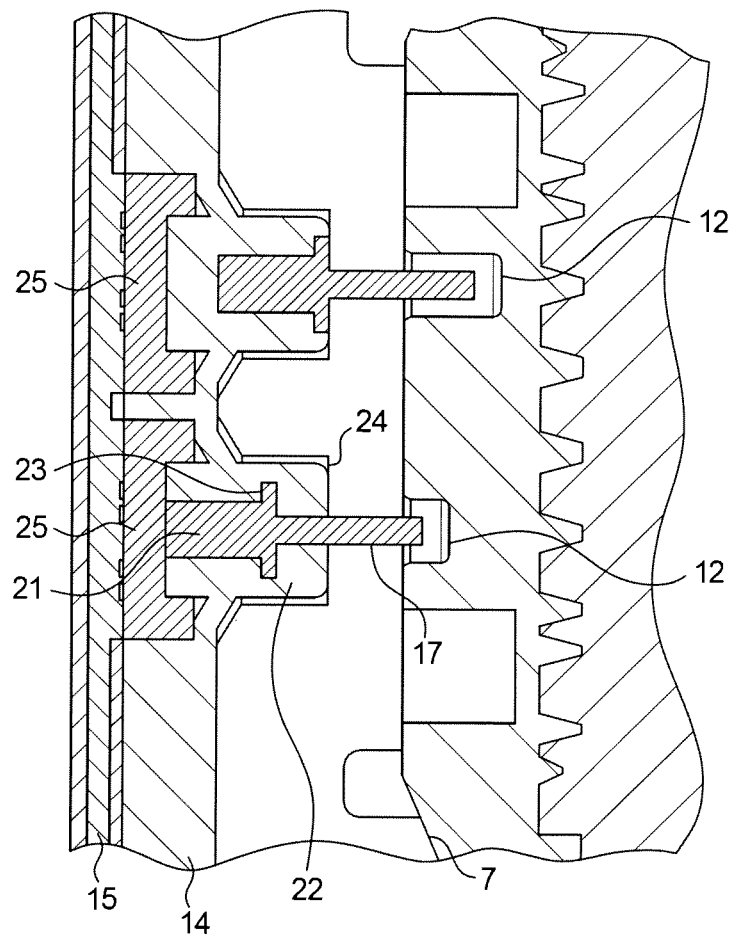
FIG. 7 shows a detailed view of the interaction part between probe means of the beverage production machine and identification member of the capsule.

FIG. 5 shows more details of the printed circuit board 15. The reference numeral 20 designates those areas which can be selectively short-circuited.

Thus the displacement of the pin 17 can selectively activate (close or open) a switch on the electronic circuitry 15.

Figure 4:
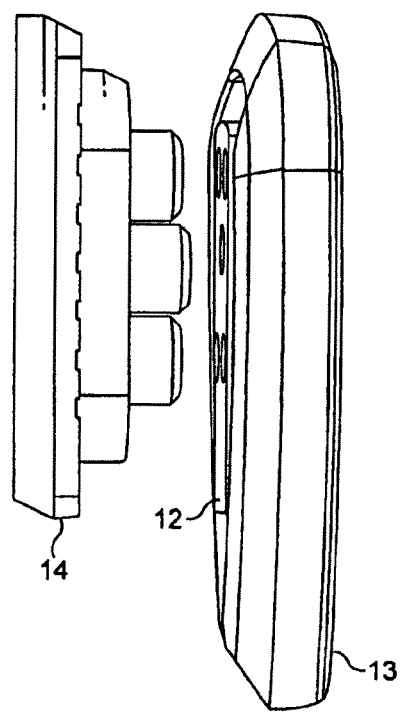
FIG. 4 shows elements of the interaction between the probe means and the capsule, i.e., the view of FIG. 3.

In FIG. 4 the isolation and biasing member 14 preferably made from a resilient material such as for example silicone is further illustrated.

The invention thus allows setting operation parameters individually for each beverage production cycle upon reading of information from the capsule from which the beverage or liquid comestible shall be produced.

The beverage production system of the invention, in particular, the displaceable probe can utilize also capsules having a visible identification member (i.e., without a protective membrane).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beverage ingredient capsule, the capsule comprising:
   a cup-shaped body;
   a lid associated to the cup-shaped body to demarcate a cavity containing beverage forming ingredients; and
   an identification member extending on a surface of the lid and away from an edge of the lid, the identification member so constructed and arranged to be physically contacted from outside the beverage ingredient capsule, wherein the identification member comprises a plurality of predetermined localized contact receivers arranged on the front of the lid in a non-linear pattern, each predetermined localized contact receiver constituting a choice between two different surface levels that correspond, upon a contact being established or not with an external probe member, to a predetermined binary coded state (0 or 1).

2. The beverage ingredient capsule of claim 1, wherein the plurality of predetermined localized contact receivers comprise first contact receivers and second contact receivers, the first contact receivers are holes of a same depth, and the second contact receivers are holes of a shorter depth.

3. The beverage ingredient capsule of claim 1, wherein the plurality of predetermined localized contact receivers comprise first contact receivers and second contact receivers filled to different depths.

4. The beverage ingredient capsule of claim 1, wherein the plurality of predetermined localized contact receivers comprise first contact receivers and second contact receivers, the first contact receivers are protruding elements of a same height, and the second contact receivers are protruding elements of a greater height.

5. The beverage ingredient capsule of claim 1, wherein the identification member is formed as an integral part of the lid.

6. The beverage ingredient capsule of claim 1, wherein the lid is integrally made of moulded plastic.

7. The beverage ingredient capsule of claim 1, wherein the plurality of predetermined localized contact receivers are grouped in a substantially polygonal, star-shaped or curved pattern or a non-regular substantially closed pattern covering the surface of the lid.

8. The beverage ingredient capsule of claim 1, fed with a liquid that interacts with the beverage forming ingredients contained in the beverage ingredient capsule.

9. The beverage ingredient capsule of claim 8, the identification member codes a parameter selected from the group consisting of a flow rate of the liquid, a temperature of the liquid, and a combination thereof.

* * * * *